March 26, 1929.  L. S. PFOUTS  1,706,589
FREEZING APPARATUS
Filed Jan. 21, 1928  3 Sheets-Sheet 1
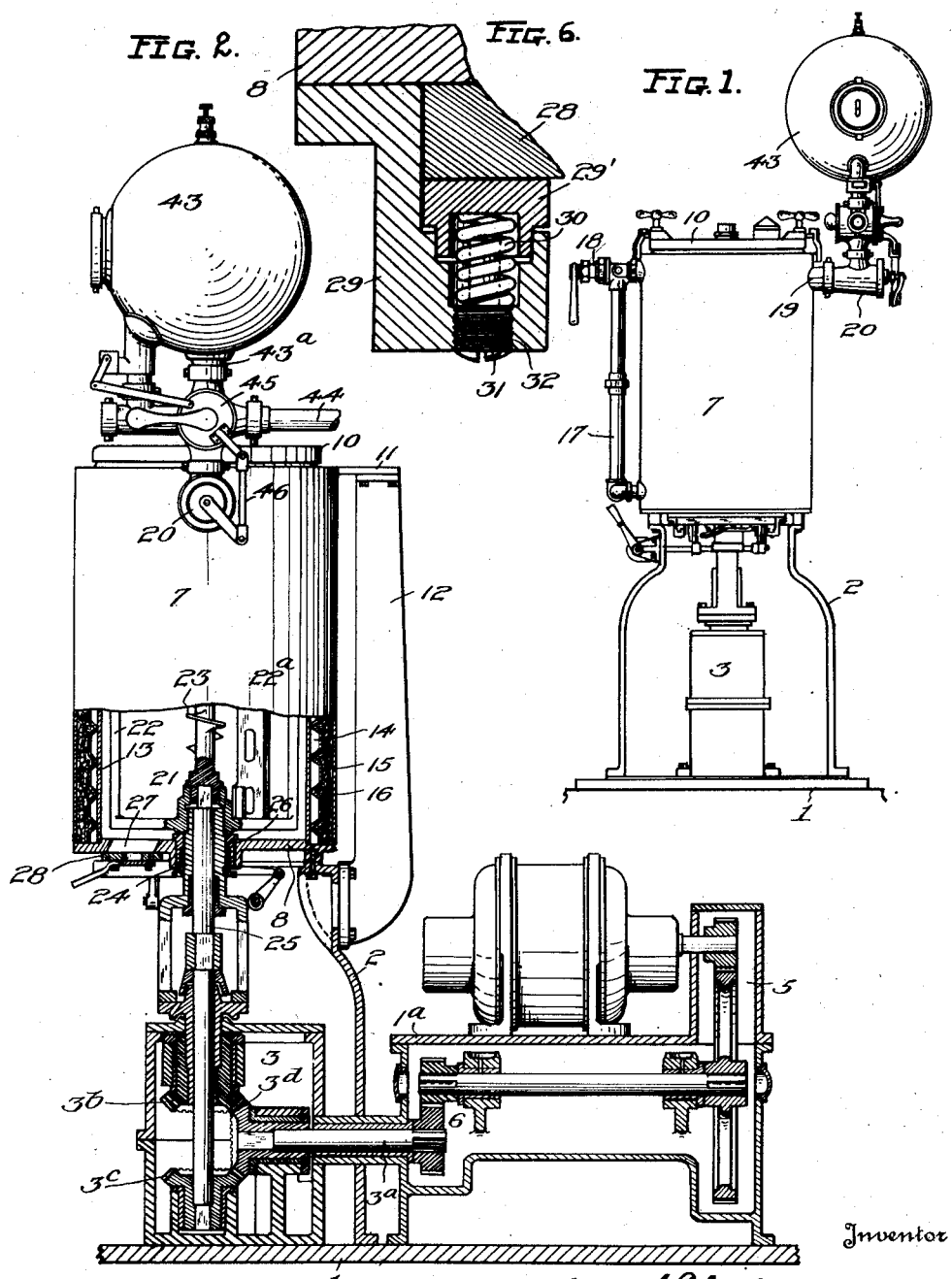

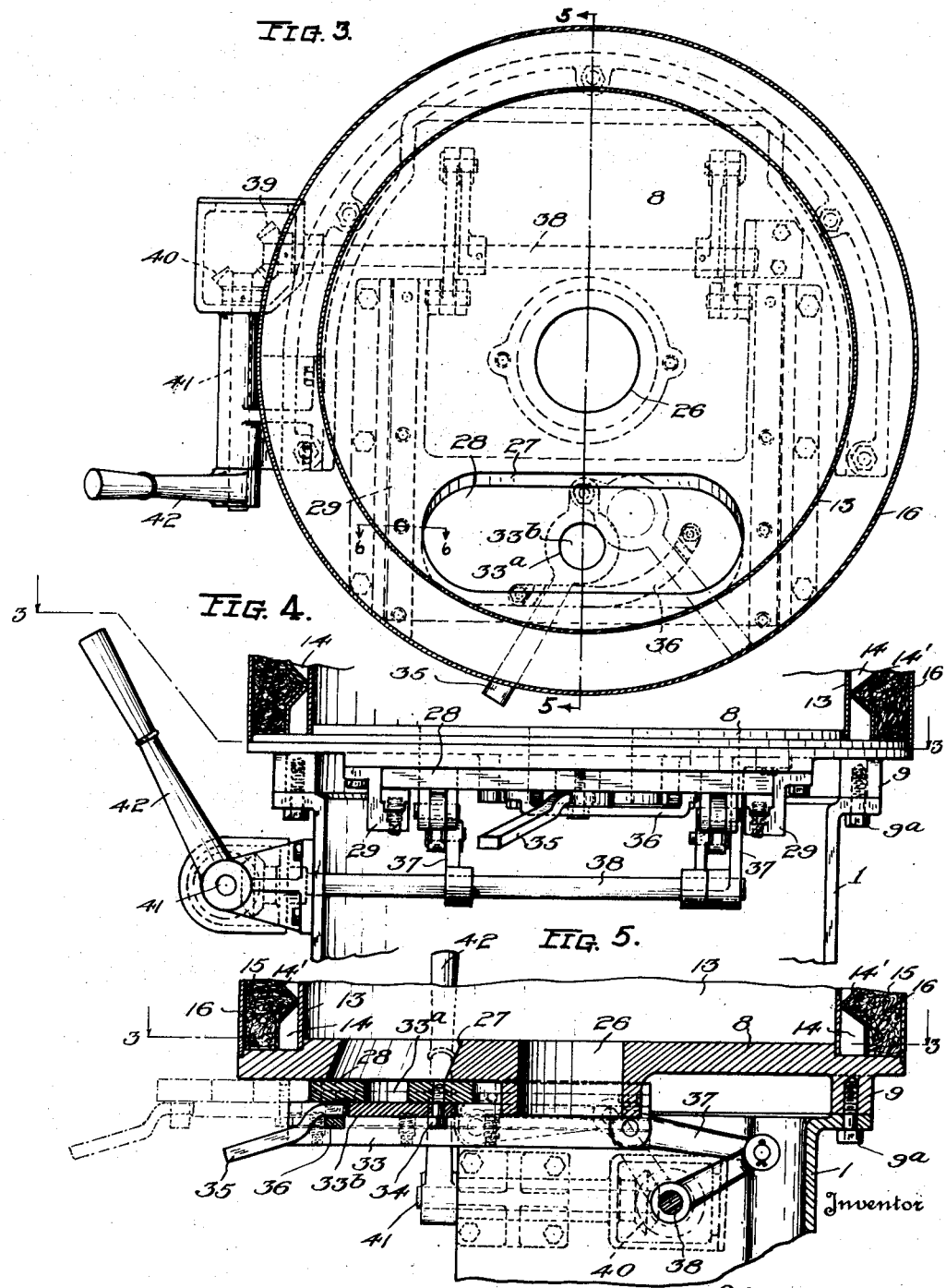

March 26, 1929.  L. S. PFOUTS  1,706,589
FREEZING APPARATUS
Filed Jan. 21, 1928    3 Sheets-Sheet 3
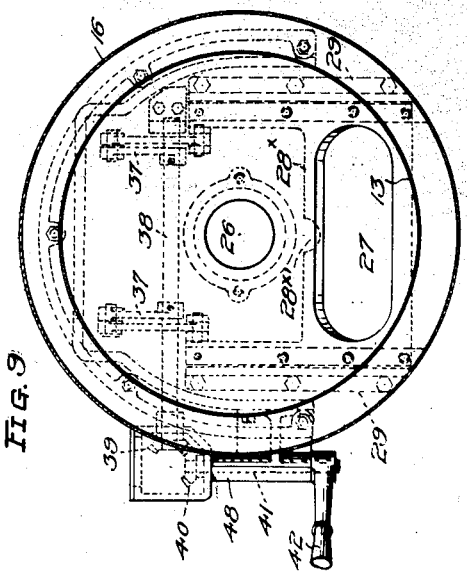
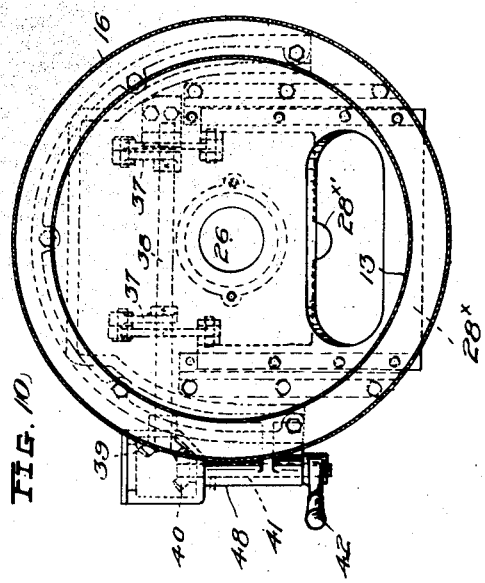
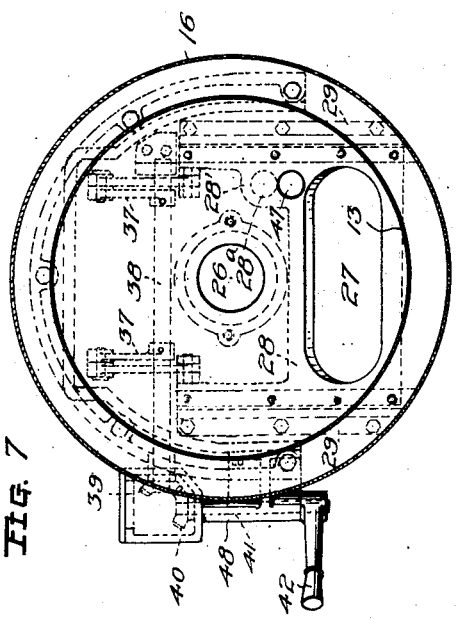
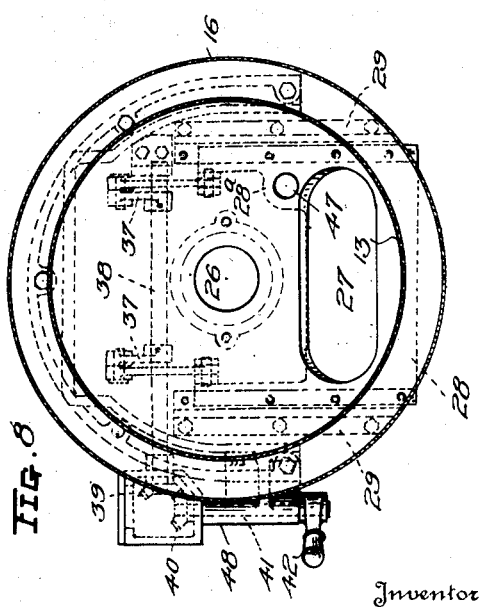

Patented Mar. 26, 1929.

1,706,589

UNITED STATES PATENT OFFICE.

LEROY S. PFOUTS, DECEASED, LATE OF CANTON, OHIO, BY JOAN S. PFOUTS, ADMINISTRATRIX, OF CANTON, OHIO, ASSIGNOR TO THE H. H. MILLER INDUSTRIES COMPANY, OF CANTON, OHIO, A CORPORATION OF OHIO.

FREEZING APPARATUS.

Application filed January 21, 1928. Serial No. 248,543.

This invention relates to an apparatus for freezing materials, such as ice cream, ices, and the like.

In the freezing of materials particularly cream and other milk products, it is desirable to beat and agitate the batch in a manner and under conditions which will uniformly and rapidly effect freezing thereof to the desired temperature and yield and to then relatively quickly and without delay in emptying or undue exposure store the frozen batch in ice and salt or in a refrigerated storing room for hardening.

One object of my invention is therefore to construct an improved freezer having a suitable valve so arranged and of a size that the entire frozen batch can be relatively quickly discharged directly into a collecting or receiving member or a storing can, so that immediately upon the completion of the freezing operation, the frozen mass is discharged before further agitating or freezing of the material can take place and without undue exposure of the frozen batch, the result being that the apparatus may be operated continuously and produce successive batches all having the same quality and weight per unit volume.

Another object of the invention is to provide an improved freezing apparatus having a valve mechanism capable of permitting a relatively small discharge or a relatively large discharge of the material being treated.

Another object of the invention is to construct a freezer having an improved valve means for permitting in a ready manner and without waste testing of the material during the freezing operation.

Other objects of the invention will be apparent to those skilled in the art to which the invention relates from the following description taken in connection with the accompanying drawings, wherein Fig. 1 is a front elevation of an apparatus for freezing materials embodying the invention.

Fig. 2 is a view, partly in side elevation looking toward the left in Fig. 1 and partly in section.

Fig. 3 is a section on the line 3—3 of Figs. 4 and 5.

Fig. 4 is a fragmentary view, partly in section.

Fig. 5 is a section on the line 5—5 of Fig. 3.

Fig. 6 is a section on the line 6—6 of Fig. 3.

Fig. 7 is a view substantially similar to Fig. 3, but showing a different embodiment of the invention.

Fig. 8 is a view similar to Fig. 7 but showing the testing valve open.

Fig. 9 is a view similar to Fig. 8, but showing another embodiment of the invention.

Fig. 10 is a view similar to Fig. 9, but showing the testing valve open.

In the drawings, 1 indicates a base on which is mounted a support 2 preferably of substantially semi-cylindrical shape to partially enclose a suitable driving mechanism, indicated as an entirety at 3. 4 indicates a motor mounted on a separate support $1^a$ and operating through suitable gear reductions 5, 6, to drive a main shaft $3^a$ of the driving mechanism 3.

7 indicates as an entirety the freezing member disposed in vertical position and having a bottom wall or head 8. The bottom or head 8 is provided with a flange 9 secured for example by cap screws $9^a$ to the upper portion of the support 2. The upper end of the freezer member 7 is provided with a ring, forming an opening which is closed by a removable head 10; the ring being provided with a bracket 11 which is secured to the upper end of a column or standard 12. The column 12 being rigidly secured to the support 2, serves to brace the freezing member 7 thereon. The freezing member 7 comprises an inner cylinder 13 and means for supplying a heat transfer medium in contact with its outer wall, such means in the present illustrated embodiment comprising a circuitous passage 14 for brine formed by a corrugated sheet metal jacket 14'. The jacket 14' may be insulated by suitable material 15 and the latter enclosed in a cylinder 16. The wall 13 and jacket 14' are connected at their ends to the head 8 and ring in a suitable manner to insure liquid-tight joints and the engaging surfaces between the ring and head 10 are ground to insure a liquid-tight fit. The brine is supplied to and conducted away from the passages 14 by pipes 17, controlled by a valve 18. The material to be frozen may be introduced into the cylinder 13 in any desired manner, but preferably by a pipe 19 leading through the side wall of the freezer member 7 at any desired point between the head 8 and ring, and the valve 20 for controlling such material supply and the devices for maintaining the opening through the pipe 19 clear may be mounted in the pipe 19; the construction and arrangement of the inlet pipe 19 and the valve and devices connected thereto being preferably similar to like parts shown in Letters Patent No. 1,191,222, dated July 18, 1916.

21 indicates as an entirety the combined agitating, beating and scraping mechanism within the cylinder 13, which may comprise one or more rotatable members depending upon the nature or character of the material being frozen. In the illustrated form of construction two members are provided, an outer member 22, which preferably includes one or more scrapers $22^a$, and an inner member 23, said members being connected (preferably removably) with shafts 24, 25, respectively extending through an opening 26 formed axially in the head 8. As shown, the shafts 24, 25, are connected to the gears $3^b$, $3^c$, of the driving mechanism 3, by means that operate to prevent leakage of liquid into the driving mechanism 3 or the casing therefor, such means forming the subject-matter of a co-pending application Ser. No. 212,977, for which reason no claim is made herein to such subject-matter. The gears $3^b$, $3^c$, mesh with and are driven in opposite directions by a main gear $3^d$ secured to the shaft $3^a$.

27 indicates a relatively large opening formed in the head 8 and serving as the discharge opening for the batch of frozen material. The opening is controlled by a valve 28, movably mounted with respect to the head 8. The opening 27 is of a size to permit the entire batch (excepting portions that may adhere to the walls and parts) to freely flow through it in a short period of time upon the operation of the valve 28 to its open position, the result being that the continued operation of the mechanism 21 during the discharge of the material (as is the customary practice) and the low temperature within the cylinder 13 and effect of the refrigerant around it, will not, to any considerable degree, change or affect the condition or temperature of the last portion of the batch to flow through opening with respect to the first portion flowing therethrough when emptying or discharge takes place. It will therefore be seen that the entire frozen mass or batch will have a substantially uniform temperature and swell. The discharged batch may flow into a storing can or into a trough, as shown in the aforesaid co-pending application. To form the opening 27, the major portion of the metal of the head 8, forward of a diametrical line extending from side to side of the head, is cut away.

The valve 28 preferably comprises a plate and may be movably supported on the lower face of the head 8, for which purpose the latter is provided with guides 29 arranged to permit the valve 28 to slide forward to the position shown in dotted lines in Fig. 5.

The valve 28 may be yieldingly pressed against the head 8 to insure liquid tightness by shoes 29' normally biased toward the valve 28 by a plurality of springs 30 supported on the heads of adjustable plugs 31 threaded in openings 32 formed in the guides 29, as shown in Fig. 6.

33 indicates a valve for permitting the discharge of a relatively small quantity of material, for example, into a small container. The valve 33 may be operated during the freezing operation, whereby the operative can, at will, permit the discharge of a small quantity into a testing can to determine the condition of the batch and its swell, so that the discharge of the entire batch of material may be effected at the proper time. In the embodiment shown in Figs. 1 to 5, inclusive, I have shown the valve 33 as mounted on the valve plate 28, the latter being formed with a relatively small opening $33^a$ and carrying a movable valve element $33^b$ arranged to open and close the valve or discharge opening $33^a$. The valve element $33^b$ may be slidably mounted on the valve plate 28 as shown in a co-pending application Ser. No. 208,235, but by preference it is mounted on a pivot 34 carried by the valve 28 (see Fig. 5) and provided with a suitable handle 35. 36 indicates a cam engaging a portion of the handle 35 and arranged to press or squeeze the valve element 33 close against the wall or surface of the valve 28 when moved to closed position. As clearly shown in Figs. 3 and 5, the opening $33^a$ in the plate 28 is arranged so that when the latter is inclosed position the opening is in registry with the main discharge opening 27, and when the plate 28 is moved to open position, the opening $33^a$ occupies a position below that portion of the head 8 forward of the opening 27 and is shut off thereby. As a result of this arrangement, but one opening is required in the head 8 for both valves; the testing valve is inoperative when the main valve is open and discharge or emptying of the cylinder can only take place through a single valve opening at a time.

The valve 28 may be operated by one or more toggles 37 connected to a rock shaft 38 suitably mounted below the head 8. The shaft 38 carries a gear 39 in mesh with a gear 40. The gear 40 is fixed to a shaft 41 which carries a lever or handle 42.

43 indicates a suitable measuring receptacle having a discharge pipe $43^a$ leading to the casing of the valve 20. 44 indicates a supply pipe leading to the receptacle 43. The pipes $43^a$, 44, are connected to each other so that a single valve 45 may control the flow alternately through them. By preference the valve 45 is connected by a linkage 46 with the valve 20 so that when the valve 45 is operated to permit discharge of the material from the receptacle 43 the valve 20 will be opened and when the discharge is cut off the valve 20 will be closed.

As shown, the testing valve is disposed on the valve plate 28. This construction and arrangement avoids the necessity of providing a valved testing outlet in and through the side walls of the cylinders forming the freezing member; on the other hand by mounting the valve 33, as shown, the cost of construction is reduced and the arrangement is relatively simple and the valves are readily operated.

In Figs. 7 and 8 I have shown another embodiment of the invention, wherein the valve mechanism is somewhat simplified. In this form of construction, the head 8 is formed with a separate opening 47, preferably in close proximity to the main valve opening 27 and so arranged that a portion of the valve 28 will control the opening of the opening 47 in its movement in one direction, for example, toward its open position. For this purpose, the valve 28 has an extended portion 28' and by preference, such portion has an opening 28ª which is adapted to register with the opening 47 when moved to a predetermined position. Such registry may be indicated for the guidance of the operative to facilitate the operation of the valve plate 28 to effect a discharge through the opening 47 or through the opening 27, by graduations or other suitable markings on the bearing sleeve 48 for the shaft 41, whereby the movement of the handle 42 to positions relative to such marks will indicate the positions of the valve plate 28.

In Figs. 9 and 10 I have shown another embodiment of the invention, wherein the construction of valve mechanism is still further simplified. In this form of valve mechanism, the valve plate 28ˣ is shaped to co-operate with a portion of the side wall forming the opening 27, so that when the valve plate is moved to a predetermined position a relatively small amount of material may be discharged, for example, for testing purposes, as already set forth, without opening the valve opening 27. In this embodiment of my invention, the inner edge of the valve plate 28ˣ is cut away, as shown at 28ˣ', preferably midway between its ends, so that when the plate is moved outwardly, to the position shown in Fig. 10, the cut away co-operates with the adjacent wall of the opening 27 to form a discharge port for the purposes already set forth. When the valve 28ˣ is moved inwardly, the opening 27 is completely closed as shown in Fig. 9; when moved outwardly to full open position, the opening 27 is completely uncovered to permit emptying of the entire frozen mass as already set forth.

The construction of freezer apparatus herein disclosed is adapted for freezing a relatively large batch or quantity of materials at each operation, for example, batches of 100 or 200 quarts. Due to the fact that the freezing cylinder is disposed in upright position and a relatively large valve is disposed in its bottom or lower head, it will be seen that when the valve element is opened, the entire frozen mass, which is in a semi-liquid condition, is free to drop or gravitate therethrough, so that all portions of the mass will flow through the valve opening before any substantial change in the condition of the last portion can take place even though the agitating mechanism is kept running as is the usual practice. As a result each batch will be uniformly frozen, and conditioned for storing. This will enable all batches to be of the same character.

In the forms of construction shown, the valve mechanisms comprise a relatively large valve opening to insure fast emptying of the frozen mass and a relatively small opening to permit the discharge at will of sufficient material for testing purposes. This arrangement simplifies the work of the operative and enables him to make as many tests as desired without danger of wasting the material or splashing it on the floor and surrounding objects.

To those skilled in the art to which this invention relates many changes in construction and widely differing embodiments and applications of the invention will suggest themselves without departing from the spirit and scope thereof. The disclosures and the description herein are purely illustrative and are not intended to be in any sense limiting.

What I claim is:

1. In apparatus of the class described, the combination of a support, a freezing member mounted thereon and comprising a cylinder disposed vertically and having heads at its upper and lower ends, an agitating device within said cylinder and means for causing a heat transfer medium to contact with the wall of said cylinder, driving means having a shaft extending centrally through said lower head for driving said agitating device, and a relatively large valve in said lower head at one side of said shaft for permitting quick emptying of the frozen mass substantially as a body therethrough.

2. In apparatus of the class described, the combination of a support, a freezing member mounted thereon and comprising a cylinder disposed vertically and having heads at its upper and lower ends, an agitating device within said cylinder and means for causing a heat transfer medium to contact with the wall of said cylinder, driving means having a shaft extending centrally through the lower head, the major portion of said lower head forward of a diametrical line extending from side to side of said cylinder being cut away to form a relatively large discharge opening to permit quick flow of the frozen mass substantially as a body therethrough, and a valve member movably mounted relative to said opening to control the discharge therethrough.

3. In apparatus of the class described, the combination of a support, a freezing member mounted thereon and comprising a cylinder disposed vertically and closed at its upper end, a head for closing the lower end of said cylinder, an agitating device within said cylinder, driving means having a shaft extending centrally through said lower head for rotating said device and means for causing a heat transfer medium to contact with the wall of said cylinder, and a plurality of valves of different capacities in said lower head at one side of said shaft, one of said valves permitting discharge of a relatively small amount of material and the other valve permitting quick emptying of said cylinder.

4. In apparatus of the class described, the combination of a support, a freezing member mounted thereon and comprising a cylinder disposed vertically and closed at its upper end, a head for closing the lower end of said cylinder, an agitating device within said cylinder, driving means having a shaft extending centrally through said lower head for rotating said device, and valve mechanism on said head for independently controlling a plurality of discharge openings of different capacities, one of the openings permitting discharge of material for testing thereof and the other opening permitting quick emptying of said cylinder.

5. In apparatus of the class described, the combination of a support, a freezing member mounted thereon and comprising a vertically disposed cylinder closed at its upper end and having a head at its lower end, a discharge valve comprising an opening formed in said lower head and a member movable to control said opening, and a separate discharge valve on said movable member.

6. In apparatus of the class described, the combination of a support, a freezing member mounted thereon and comprising a vertically disposed cylinder closed at its upper end and having a head at its lower end, an agitating device within said cylinder, driving means having a shaft extending centrally through said lower head for driving said device, a valve arranged to permit the discharge of the frozen material to quickly empty said cylinder, said valve comprising a relatively large opening formed in said lower head to permit the discharge of the frozen mass substantially as a body and a member movable to control said opening, and a separate valve in the lower portion of said freezing member to permit the discharge therefrom of relatively small quantities of material.

7. In apparatus of the class described, the combination of a support, a freezing member mounted thereon and comprising a vertically disposed cylinder having a head at its lower end, a main valve comprising a relatively large opening formed in said lower head permitting quick emptying of the frozen mass substantially as a body therethrough and a valve element for controlling said opening, said valve element provided with a separate valve comprising a movable valve element on the first mentioned element and an opening formed in said first mentioned element arranged to register with the opening for said main valve when the latter is closed.

8. In apparatus of the class described, the combination of a support, a freezing member mounted thereon and comprising a vertically disposed cylinder having a head at its lower end, and a plurality of discharge valves on said head of different capacities so arranged that one thereof is made in-operative when the other valve is operated, one of said valves permitting the quick emptying of the contents of said cylinder.

9. In apparatus of the class described, the combination of a support, a freezing member mounted thereon and comprising a vertically disposed cylinder having a head at its lower end, said head being formed with a main discharge opening for permitting quick emptying of said cylinder, a valve plate slidable relative to the lower surface of said head to control said opening, and a valve carried by said plate, the last mentioned valve comprising an opening formed in said plate and an element controlling said opening, said opening being in registry with the main discharge opening when the valve plate is in closed position but movable to an in-operative position below the wall of said head when said valve plate is operated.

10. In apparatus of the class described, the combination of a support, a freezing member mounted thereon and comprising a closed cylinder, agitating means within said cylinder, and a compound valve mechanism in the lower portion of said freezing member and comprising a relatively large opening formed in said cylinder, a valve element for controlling the discharge through said opening, a relatively small opening formed in said valve element arranged to register with the first mentioned opening when the valve element therefor is closed and a separate valve element on the first mentioned valve element for controlling the discharge through said relatively small opening.

In testimony whereof, I have hereunto signed my name.

JOAN S. PFOUTS,
*Administratrix of the Estate of Leroy S. Pfouts, Deceased.*